(12) United States Patent
El Chebib et al.

(10) Patent No.: US 10,439,681 B1
(45) Date of Patent: Oct. 8, 2019

(54) SYSTEMS AND METHODS FOR DYNAMIC INTER-SECTOR MIMO TRANSMISSION

(71) Applicant: Verizon Patent and Licensing Inc., Arlington, VA (US)

(72) Inventors: Nader El Chebib, Louisville, KY (US); Edwin Ratchaganathan, Noblesville, IN (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/136,617

(22) Filed: Sep. 20, 2018

(51) Int. Cl.
| | |
|---|---|
| *H04B 7/024* | (2017.01) |
| *H04W 8/22* | (2009.01) |
| *H04W 16/10* | (2009.01) |
| *H04W 36/00* | (2009.01) |
| *H04B 7/0413* | (2017.01) |
| *H04L 5/00* | (2006.01) |

(52) U.S. Cl.
CPC ........... *H04B 7/024* (2013.01); *H04B 7/0413* (2013.01); *H04W 8/22* (2013.01); *H04W 16/10* (2013.01); *H04W 36/0027* (2013.01); *H04L 5/0023* (2013.01); *H04L 5/0035* (2013.01); *H04L 5/0058* (2013.01); *H04L 5/0094* (2013.01)

(58) Field of Classification Search
CPC ... H04L 5/0023; H04L 5/0058; H04L 5/0035; H04L 5/0094; H04L 25/03343; H04W 24/02; H04B 7/0413; H04B 7/024; H04B 7/0608
USPC .......................................................... 375/262
See application file for complete search history.

(56) References Cited

U.S. PATENT DOCUMENTS

2010/0290382 A1* 11/2010 Hui .................. H04B 7/024
                                                    370/312
2015/0222342 A1*  8/2015 Liu .................. H04B 7/0413
                                                    375/295

* cited by examiner

*Primary Examiner* — Leila Malek

(57) ABSTRACT

A first base station determines a maximum MIMO capability of a UE that equals a maximum number of spatial layers that the UE can receive. The first base station determines if the number of transmit antennas of the first base station, that serves a location of the UE, is less than the maximum MIMO capability of the UE and identifies adjacent sectors that currently serve the location of the UE. The first base station selects at least one adjacent sector, associated with a second base station, from the identified adjacent sectors based on the number of transmit antennas of the first base station being less than the maximum MIMO capability of the UE, and causes data to be transmitted to the UE via one or more transmit antennas of the first base station and at least one transmit antenna associated with the selected at least one adjacent sector.

20 Claims, 11 Drawing Sheets

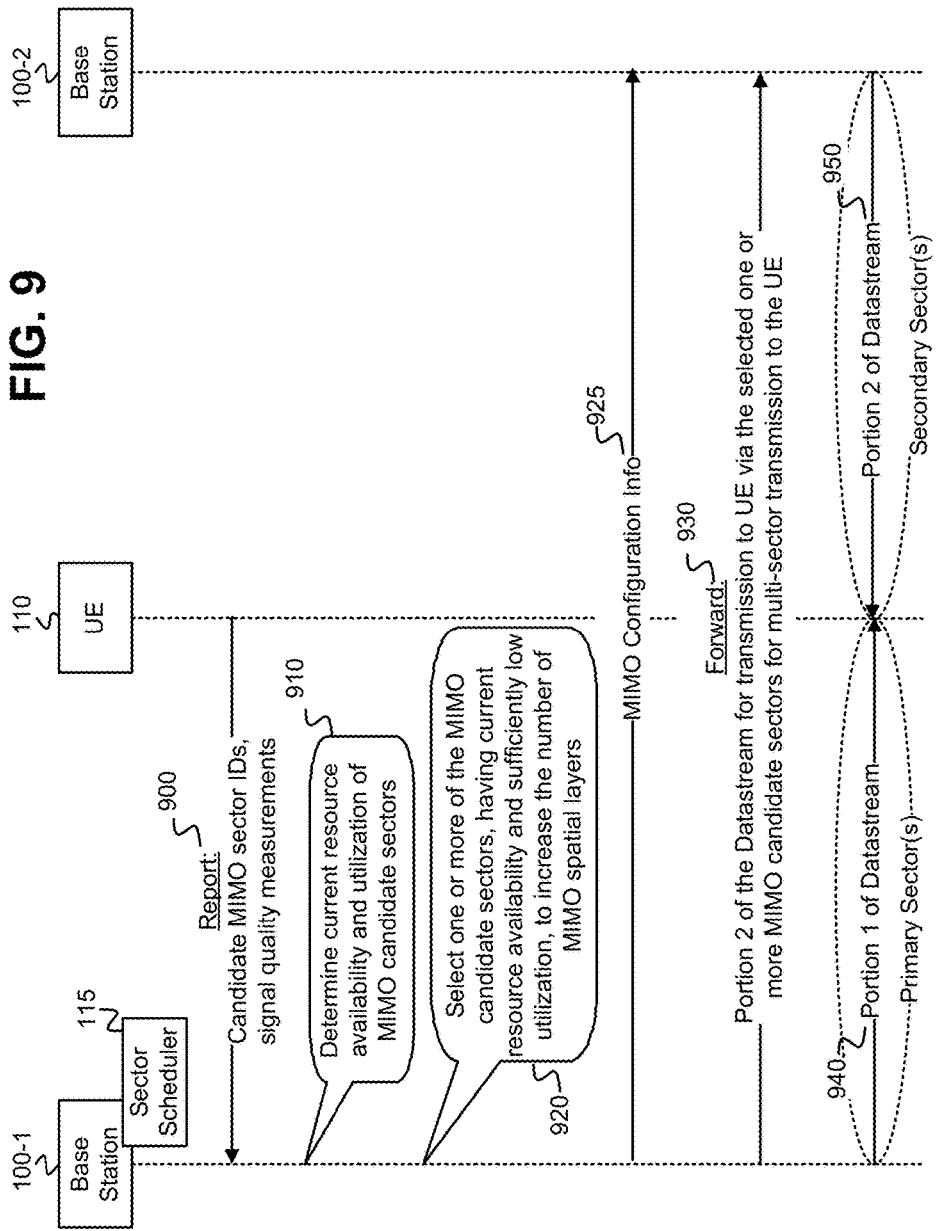

SYSTEMS AND METHODS FOR DYNAMIC INTER-SECTOR MIMO TRANSMISSION

BACKGROUND

Multiple-input and multiple-output (MIMO) is a technique for using multiple transmit and receive antennas to multiply the capacity of a radio link and exploit multipath propagation. Full dimension MIMO (FD-MIMO) involves multiple transmit and receive antennas that can form beams in both horizontal and vertical directions such that the beams can cover anywhere in three-dimensional space in the vicinity of the multiple antennas.

Spatial multiplexing is a transmission technique in MIMO wireless communication. In spatial multiplexing, a datastream is divided into different substreams and transmitted in parallel to a destination device. Each substream is separately encoded and transmitted via a different one of multiple transmit antennas. At the destination wireless device, antennas, corresponding in number to the number of transmit antennas, receive the encoded substreams and associated receiver circuitry decodes each substream. The circuitry then recombines the substreams into the original datastream. Each separately encoded substream, transmitted by a different MIMO transmit antenna, is referred to as a "spatial layer." Spatial multiplexing in MIMO communication increases the effective data transmission throughput to a destination wireless device.

BRIEF DESCRIPTION OF THE DRAWINGS

FIG. 9 is an operations and messaging diagram associated with the exemplary process of FIGS. 8A and 8B.

DETAILED DESCRIPTION OF THE PREFERRED EMBODIMENTS

The following detailed description refers to the accompanying drawings. The same reference numbers in different drawings may identify the same or similar elements. The following detailed description does not limit the invention, which is defined by the claims.

Exemplary embodiments described herein dynamically reconfigure MIMO transmission involving sectors associated with a primary base station. Such reconfigurations add one or more sectors associated with a secondary base station to increase the number of spatial layers. A sector scheduler at the primary base station determines that the number of transmit antennas available at the primary base station is less than the maximum MIMO capability of the UE, and selects one or more sectors from a set of adjacent sectors currently providing radio coverage to the location of the UE. The additional sectors increase the effective number of antennas transmitting a datastream to the UE via parallel spatial layers. The sector scheduler at the primary base station obtains, from the UE, signal quality measurements for each of the adjacent sectors, and obtains resource availability and utilization information for each of the adjacent sectors from the secondary base station. The sector scheduler reconfigures the MIMO transmission to the UE to increase the number of spatial layers based on the obtained current resource availability and utilization information.

Figure 1:
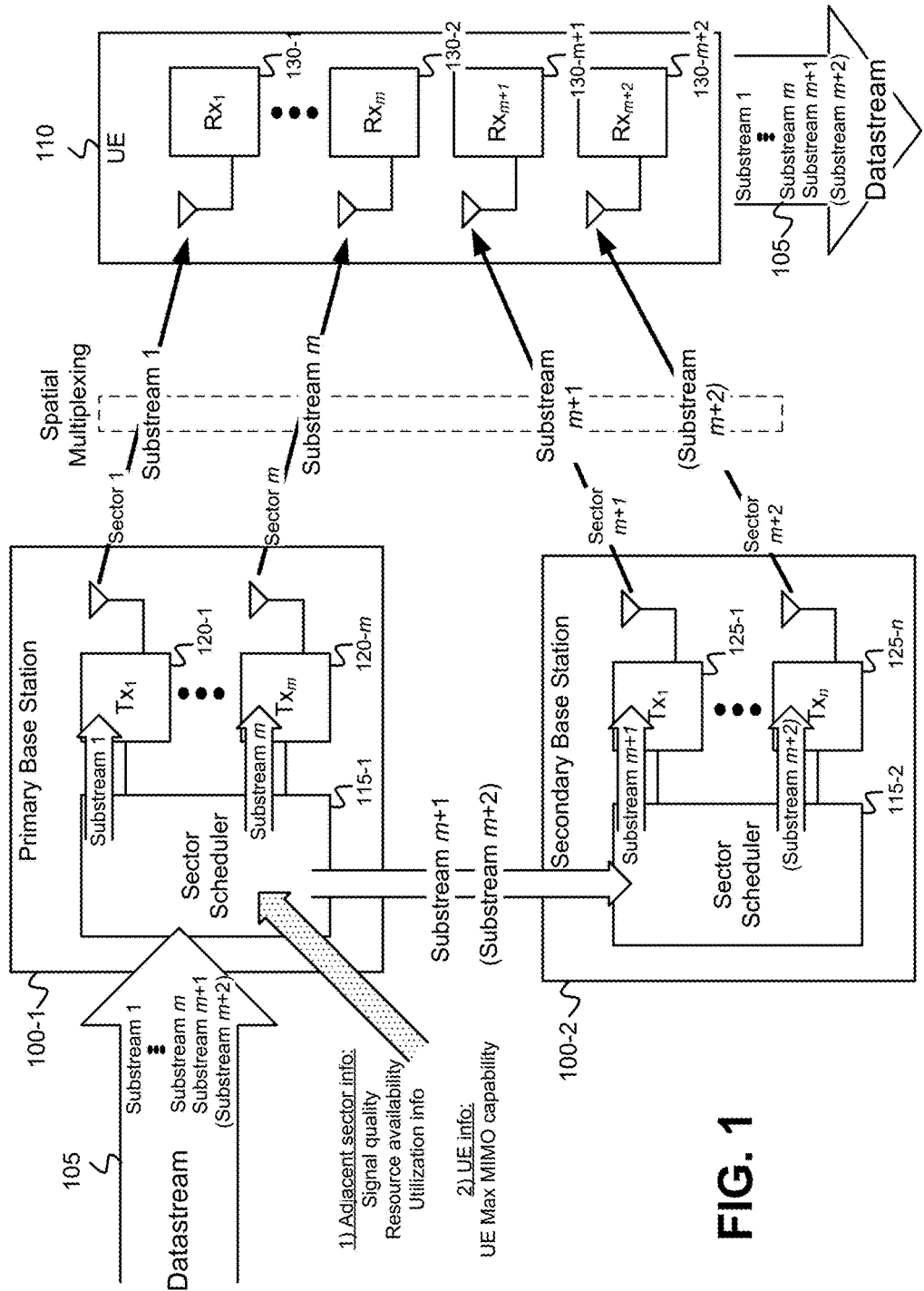
FIG. 1 depicts an overview of exemplary dynamic inter-sector MIMO transmission from a primary base station, and at least one secondary base station, to a user equipment (UE)

FIG. 1 depicts an overview of exemplary dynamic inter-sector MIMO transmission from a primary base station, and at least one secondary base station, to a UE. As shown, a primary base station 100-1 receives a datastream 105 destined for a UE 110. A sector scheduler 115-1 associated with the primary base station 100-1 obtains signal quality measurements from UE 110. The measurements indicate the qualities of signals from multiple adjacent sectors (i.e., sectorized cells of a cellular network) that serve the UE 110 at the UE 110's current location. A "primary base station," referred to herein, includes the base station to which a UE 110 initially establishes at least one connection. "Adjacent sectors," as referred to herein, includes multiple sectorized cells that have at least partial overlapping coverage at a particular UE location, where the adjacent sectors may be associated with multiple different base stations (e.g., a primary base station, and at least one secondary base station). The adjacent sectors may be generated by antenna arrays associated with a primary base station and multiple secondary base stations. For example, in the example of FIG. 1, adjacent sectors 1, m, and m+1 (where m is greater than or equal to zero) may each include antenna beam patterns that provide radio coverage to a current location of UE 110. Transmitter $Tx_1$ 120-1 of primary base station 100-1 may generate sector 1, transmitter $Tx_m$ 120-$m$ of primary base station 100-1 may generate sector m, and transmitter $Tx_1$ 125-1 of secondary base station 100-2 may generate sector m+1. In an additional implementation, transmitter $Tx_n$ 125-$n$ of secondary base station 100-2 may, as shown in FIG. 1, generate sector m+2. Alternatively, a transmitter of another secondary base station (not shown in FIG. 1) may generate sector m+2.

The primary base station 100-1 additionally obtains resource availability information and utilization information for each of the adjacent sectors that currently serve the UE 110 at the UE 110's location. The resource availability information includes an indication of currently available radio resources (e.g., available time slot, frequency slot, etc.) within each sector. The utilization information includes, for example, an average number of connections, an average bandwidth utilization, or an average signaling utilization, within each sector. UE 110 may further report the UE 110's maximum MIMO capability to the primary base station 100-1. The UE 110's maximum MIMO capability includes the maximum number of spatial layers that the UE 110 can currently receive. Each spatial layer involves transmission of a substream of a datastream via a transmit antenna and its corresponding sector, and reception of the transmitted substream at a receive antenna at the UE.

The sector scheduler 115-1 of the primary base station 100-1 determines if the UE 110 has a maximum MIMO capability that exceeds the transmit antenna availability at the primary base station 100-1. For example, if the primary base station 100-1 has two transmit antennas available for transmitting spatial layers, and UE 110 has a maximum MIMO capability of four receive antennas, then the UE 110's maximum MIMO capability exceeds the transmit antenna availability of the primary base station 100-1 by two. FIG. 1 depicts UE 110 as including receivers 130-1 through 130-$m$+1, where m may be equal to or greater than zero, and the maximum MIMO capability of UE 110 would be m+1 spatial layers. FIG. 1 further depicts an additional implementation in which UE 110 includes receivers 130-1 through 130-$m$+2, and the maximum MIMO capability of UE 110 would be m+2 spatial layers.

From among the adjacent sectors that serve the current location of the UE 110, the sector scheduler 115-1 of the primary base station 100-1 selects one or more of the adjacent sectors and identifies the network address of one or more base stations (e.g., the secondary base station 100-2 in FIG. 1) that generate the selected one or more adjacent sectors. The selected one or more adjacent sectors may include sectors associated with two or more secondary base stations. The sector scheduler 115-1 may base the selection of the one or more of the adjacent sectors on a current resource availability and utilization determined for each of the adjacent sectors. Determining the current resource availability for each adjacent sector may include, for example, determining if a channel (e.g., time slot, frequency, etc.) is currently available for use in the adjacent sector. Determining current utilization for each adjacent sector may include, for example, determining the average number of connections, the average bandwidth utilization, and/or the average signaling utilization within each adjacent sector. Other utilization parameters may, however, be used as a basis for selecting the one or more adjacent sectors. The sector scheduler 115-1 selects the one or more of the adjacent sectors based on a difference between the transmit antenna availability at the primary base station 100-1 and the maximum MIMO capability of the UE 110. For example, if the UE 110 has a maximum MIMO capability of four receive antennas (i.e., a maximum spatial layer capability of four), and the primary base station 100-1 has two transmit antennas available, then sector scheduler 115-1 may select two adjacent sectors (4 receive antennas−2 available transmit antennas=2 sectors) that are served by the secondary base station 100-2 (or are served by the secondary base station 100-2 and another secondary base station not shown in FIG. 1). As another example, if the UE 110 has a maximum MIMO capability of four receive antennas, the primary base station 100-1 has two transmit antennas available, and the secondary base station only has one transmit antenna available, then sector scheduler 115-1 may select one adjacent sector that is served by the secondary base station 100-2. Therefore, if the maximum MIMO capability of the UE 110 exceeds the transmit antenna availability at the primary base station 100-1, sector scheduler 115-1 attempts to select a number of adjacent sectors, if available, that equals the maximum MIMO capability of the UE 110. The adjacent sectors may, in some circumstances, be selected from multiple sectors generated by multiple different secondary base stations (e.g., two or more secondary base stations).

The sector scheduler 115-1 then divides the datastream 105 destined for the UE 110 into x substreams, where x equals the number of spatial layers to be used to transmit the datastream 105 to the UE 110. In the example where the UE 110 has a maximum MIMO capability of four receive antennas, the primary base station 100-1 has two transmit antennas available, and the secondary base station only has one transmit antenna available, the datastream 105 may be divided into x=three substreams for transmission via three different spatial layers. Two of the substreams are transmitted by the available transmit antennas of the primary base station 100-1 (transmit antennas $Tx_1$ 120-1 and $Tx_m$ 120-$m$), and the third substream may be forwarded to the secondary base station 100-2 for transmission via the selected adjacent sector served by the single available transmit antenna (transmit antenna $Tx_1$ 125-1).

In the example where the UE 110 has a maximum MIMO capability of four receive antennas, the primary base station 100-1 has two transmit antennas available, and the secondary base station has two transmit antennas available, the datastream 105 destined for the UE 110 may be divided into x=four substreams for transmission via four different spatial layers. Two of the substreams are transmitted by the available transmit antennas of the primary base station 100-1 (transmit antennas $Tx_1$ 120-1 and $Tx_m$ 120-$m$), and the third and fourth substreams may be forwarded to the secondary base station 100-2 for transmission via the selected adjacent sectors served by the two available transmit antennas (transmit antennas $Tx_1$ 125-1 and $Tx_n$ 125-$n$) of the secondary base station 100-2.

Upon receipt of the substreams of the datastream 105 via the multiple receive antennas 130, UE 110 may decode and recombine the substreams, as shown in FIG. 1, to recreate the original datastream 105.

Figure 2:
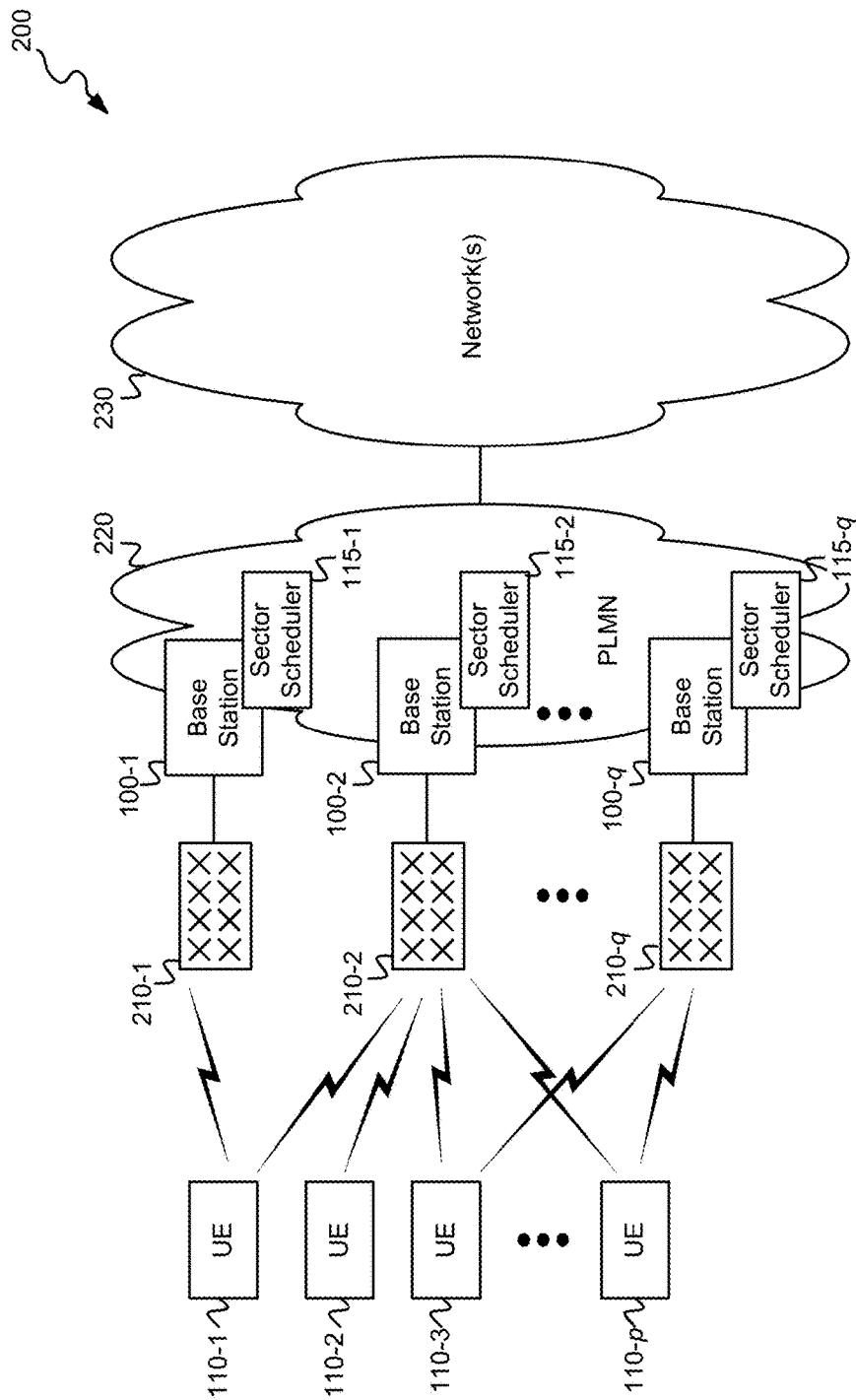
FIG. 2 illustrates an exemplary network environment in which dynamic inter-sector MIMO transmission to UEs may be implemented.

FIG. 2 illustrates an exemplary network environment 200 in which dynamic inter-sector MIMO transmission to UEs 110 may be implemented. As shown, network environment 200 includes multiple UEs 110-1 through 110-$p$ (where p is greater than or equal to one), multiple base stations 100-1 through 100-$q$ (where q is greater than or equal to two), a Public Land Mobile Network (PLMN) 220, and a network 230.

UEs 110-1 through 110-$p$ (referred to herein as "UEs 110" or "UE 110") each include any type of computational device having one or more communication interfaces for communicating via network PLMN 220 and/or network(s) 230. UEs 110 may each include, for example, a cellular telephone; a smart phone; a personal digital assistant (PDA); a wearable computer; a desktop, laptop, palmtop or tablet computer; or a media player. A "user" (not shown in FIG. 2) may be associated with each UE 110, and may be an owner, operator, and/or a permanent or temporary user of the UE 110.

Each of base stations 100-1 through 100-$q$ (referred to herein as "base stations 100" or "base station 100") may include any type of network node that is involved with interconnecting PLMN 220 with UEs 110 via a wireless interface, such as, for example, a base transceiver station (BTS), a NodeB, an eNodeB, or a gNodeB. Base stations 100 may reside in PLMN 220 and may each be connected to at least one of antenna arrays 210-1 through 210-$q$ (referred to herein as "antenna arrays 210" or "antenna array 210"). For example, as shown in FIG. 2, base station 100-1 may connect to antenna array 210-1, base station 100-2 may connect to antenna array 210-2, etc. Each of base stations 100 may further be associated with a respective one of sector schedulers 115-1 through 115-*q* (referred to herein as "sector schedulers 115" or "sector scheduler 115"). In one implementation, sector scheduler 115-1 may connect to, and serve, base station 100-1; sector scheduler 115-2 may connect to, and serve, base station 100-2; etc. Each of sector schedulers 115 may, in one implementation, be implemented by a respective base station 100. In other implementations, each of sector schedulers 115 may be a stand-alone device residing within PLMN 220 or network(s) 230. Each of antenna arrays 210-1 through 210-*q* may include a MIMO array of antennas that may form antenna beams (referred to herein as "sectors") to enable each antenna array 210 to cover a specific three-dimensional space in the vicinity of each antenna array 210. Each antenna array 210 may include a number of horizontal antennas and a number of vertical antennas arranged in a row(s) and column(s) configuration. Though each antenna array 210 is depicted in FIG. 2 as having a 2×4 (rows by columns) array configuration, the number of rows and columns of each antenna array 210 may vary.

Each of base stations 100 may include a wireless station of PLMN 220 that connects to a respective one of antenna arrays 210 and controls the transmission and receipt of data via a wireless interface. In one implementation, each of base stations 100 includes an Evolved NodeB of a Long Term Evolution (LTE) PLMN that further includes the hardware that communicates between other nodes of the PLMN and UEs that are located within antenna beam patterns formed by respective antenna arrays 210. Base stations 100 may include other types of wireless stations used in a PLMN 220, such as, for example, base transceiver stations (BTSs), gNodeBs, remote radio heads (RRHs), etc.

PLMN 220 may include any type of PLMN (e.g., a Code Division Multiple Access (CDMA) PLMN, a Global System for Mobile Communications (GSM) PLMN, a Long Term Evolution (LTE) PLMN, and/or other types of PLMNs) that enables wireless communication with UEs 110.

Network(s) 230 may include one or more networks of various types including, for example, a telecommunications network (e.g., Public Switched Telephone Networks (PSTNs)), a wired and/or wireless local area network (LAN), a wired and/or wireless wide area network (WAN), a metropolitan area network (MAN), an intranet, the Internet, or a cable network (e.g., an optical cable network). PLMN 220 may interconnect with networks(s) 230 (e.g., via a gateway device) to enable data communication between UEs 110 and network(s) 230 via PLMN 220.

The configuration of the components of network environment 200 depicted in FIG. 2 is for illustrative purposes only, and other configurations may be implemented. Therefore, network environment 200 may include additional, fewer and/or different components, that may be configured differently, then depicted in FIG. 2. For example, though a single antenna array 210 is depicted as connecting to a single base station 100 in FIG. 2, multiple antenna arrays 210 may connect to a single base station 100.

Figure 3:
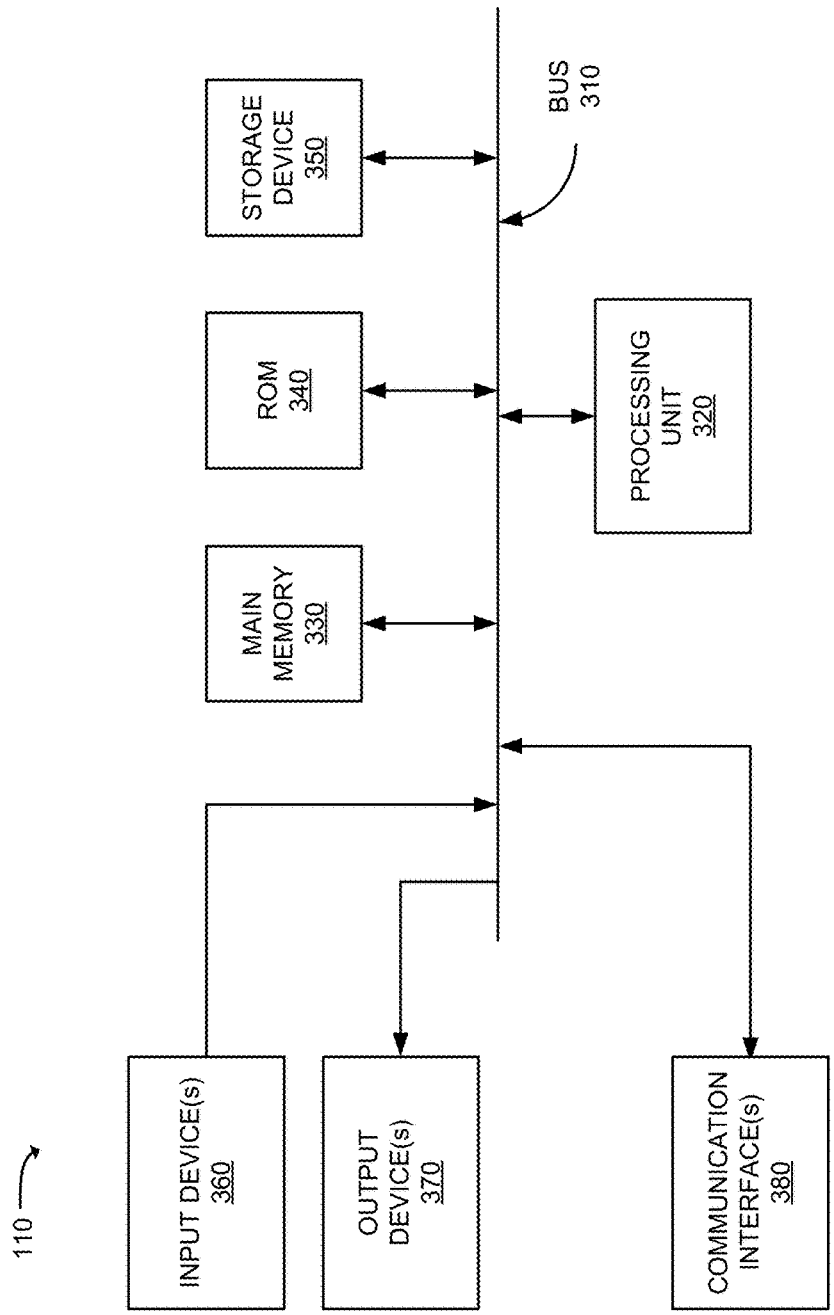
FIG. 3 is a diagram that depicts exemplary components of a UE of FIG. 1.

FIG. 3 is a diagram that depicts exemplary components of a UE 110. Base stations 100, and other nodes/components of PLMN 220 (e.g., sector schedulers 115-1 through 115-*q*) may each include the same, or similar, components to those of UE 110 shown in FIG. 3, possibly with additional or different components that are not shown in FIG. 3. For example, instead of communication interface(s) 380, a base station 100 may include an antenna array 210, at least one baseband processor, and a transmitter/receiver for each antenna in the array 210. UE 110 may include a bus 310, a processing unit 320, a main memory 330, a read only memory (ROM) 340, a storage device 350, an input device(s) 360, an output device(s) 370, and a communication interface(s) 380.

Bus 310 includes a path that permits communication among the components of UE 110. Processing unit 320 may include one or more processors or microprocessors, or processing logic, which may interpret and execute instructions. Main memory 330 may include a random access memory (RAM) or another type of dynamic storage device that may store information and instructions for execution by processing unit 320. ROM 340 may include a ROM device or another type of static storage device that stores static information and instructions for use by processing unit 320. Storage device 350 may include a magnetic and/or optical recording medium. Main memory 330, ROM 340 and storage device 350 may be referred to herein as a "non-transitory computer-readable medium" or "non-transitory storage medium."

Input device(s) 360 may include one or more mechanisms that permit a user to input information to UE 110, such as, for example, a keypad or a keyboard, a display with a touch sensitive panel, voice recognition and/or biometric mechanisms, etc. Output device(s) 370 may include one or more mechanisms that output information to the user, including a display (e.g., with a touch sensitive panel), a speaker, etc. Input device(s) 360 and output device(s) 370 may be implemented as a graphical user interface (GUI) (e.g., a touch screen GUI that uses any type of touch screen device) that displays GUI information and which receives user input via the GUI. Communication interface(s) 380 may include a transceiver that enables device UE 110 to communicate with other devices and/or systems. For example, communication interface(s) 380 may include wireless transceivers for communicating with base stations 100 of PLMN 220.

The configuration of components of UE 110 shown in FIG. 3 is for illustrative purposes. Other configurations may be implemented. Therefore, UE 110 may include additional, fewer and/or different components, arranged in a different configuration, than depicted in FIG. 3.

Figure 4:
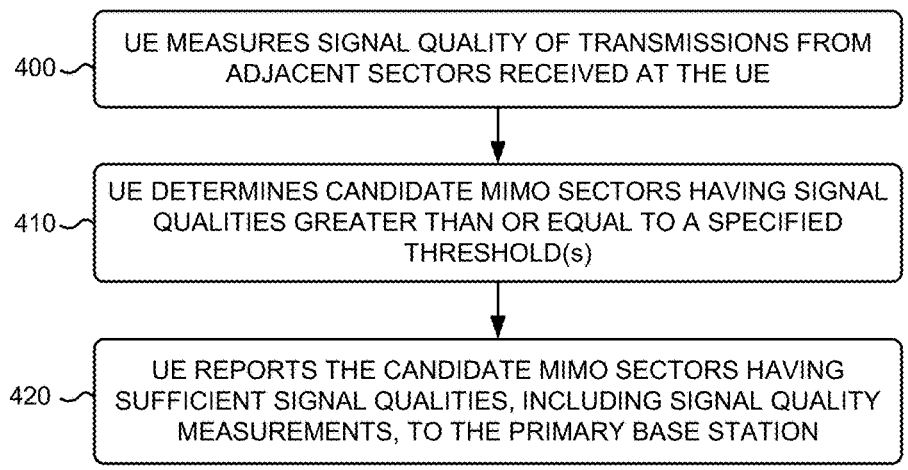
FIG. 4 is a flow diagram that illustrates an exemplary process for UE measurement and reporting of signal qualities associated with adjacent sectors that serve a current location of a UE.

FIG. 4 is a flow diagram that illustrates an exemplary process for UE measurement and reporting of signal qualities associated with adjacent sectors that serve a current location of a UE 110. The exemplary process of FIG. 4 may be implemented by UE 110, in conjunction with a base station 100 that serves as a primary base station for the UE 110.

Figure 5:
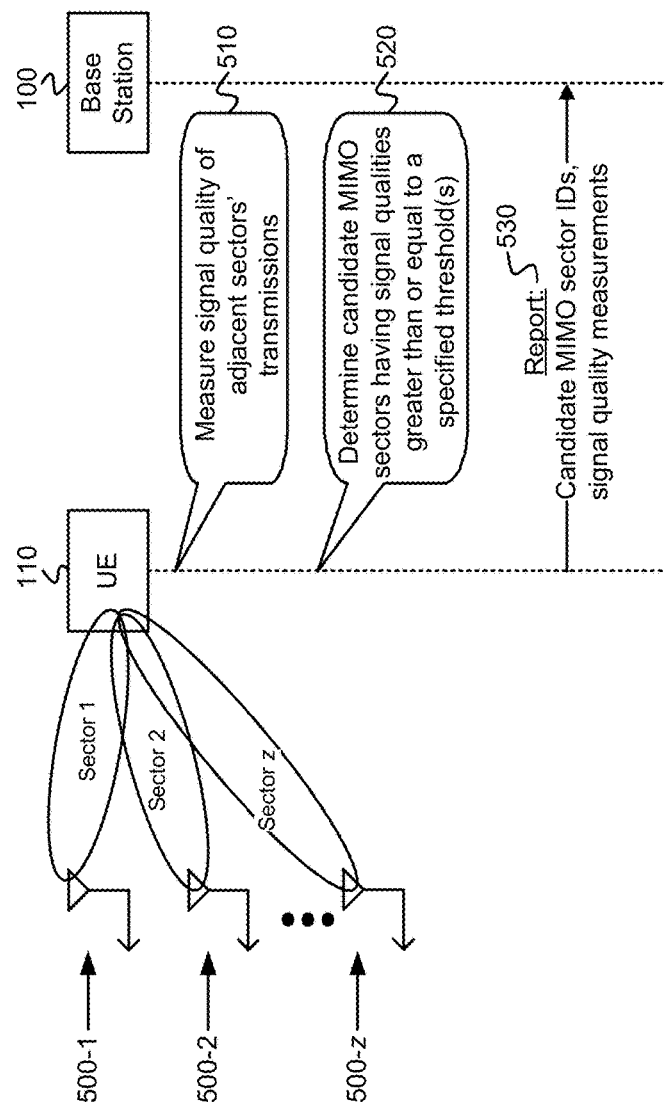
FIG. 5 is an operations and messaging diagram associated with the exemplary process of FIG. 4.

The exemplary process includes UE 110 measuring a signal quality of transmissions from adjacent sectors received at the UE 110 (block 400). UE 110 may conduct one or more of various types of signal quality measurements including, for example, Received Signal Strength Indicator (RSSI) measurements, Reference Signal Received Power (RSRP) measurements, Reference Signal Received Quality (RSRQ) measurements, and/or Signal to Interference and Noise Ratio (SINR) measurements. UE 110 may conduct the signal quality measurements for each adjacent sector of multiple adjacent sectors that has radio coverage at the location of the UE 110, where the multiple adjacent sectors may be associated with multiple different base stations (e.g., a primary base station, and one or more secondary base stations). FIG. 5 depicts UE 110 measuring 510 signaling qualities associated with multiple adjacent sectors generated by multiple transmit antennas 500-1 through 500-*z*. In the example of FIG. 5, transmit antenna 500-1 may be associated with a first base station (base station 100), transmit antenna 500-2 may be associated with the first base station, and transmit antenna 500-*z* may be associated with a second base station (not shown). Alternatively, transmit antenna 500-1 may be associated with the first base station (base station 100), transmit antenna 500-2 may be associated with a second base station (not shown), and transmit antenna 500-z may be associated with a third base station (not shown).

UE 110 determines candidate MIMO sectors having signal qualities greater than or equal to a specified threshold(s) (block 410). Each type of signal quality measurement may have a specified threshold (e.g., $Th_1$ for RSSI measurements, $Th_2$ for RSRP measurements, $Th_3$ for RSRQ measurements, $Th_4$ for SINR measurements), and the measured signal quality(ies) may be compared to the appropriate specified threshold(s) to determine whether the measured signal quality(ies) is/are greater than or equal to the threshold(s). For example, if the SINR is measured for adjacent sectors Sector1, Sector2, Sector3, and Sector4, and only the measured SINR for Sector4 does not equal or exceed the threshold $Th_4$, then the candidate MIMO sectors would be determined to be Sector1, Sector2, and Sector3. FIG. 5 depicts UE 110 determining 520 candidate MIMO sectors having signal qualities greater than or equal to a specified threshold(s).

UE 110 reports the candidate MIMO sectors having sufficient signal qualities, including signal quality measurements, to the primary base station 100 (block 420). UE 110 formulates a report that includes unique identifiers (IDs) for each of the determined candidate MIMO sectors, and also includes the respective signal quality measured for each of the determined candidate MIMO sectors. UE 110 then sends the report to the primary base station 100. FIG. 5 depicts UE 110 sending a report 530 to the primary base station 100 that includes candidate MIMO sector IDs, and associated signal quality measurements.

The blocks of FIG. 4 may be periodically, or continuously, repeated to maintain updated signal quality measurements of adjacent sectors that serve the current location of the UE 110, and to maintain an updated list of candidate MIMO sectors.

Figure 6:
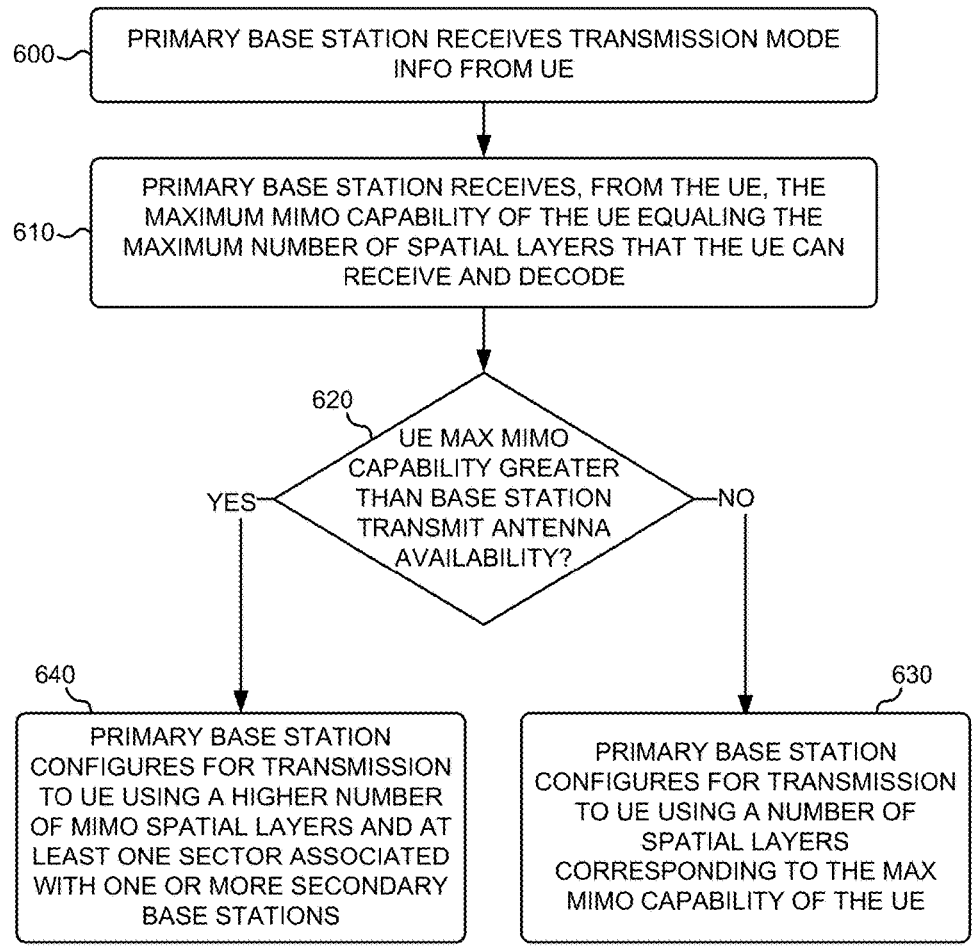
FIG. 6 is a flow diagram that illustrates an exemplary process for configuring for Public Land Mobile Network transmission to a UE, using a higher number of MIMO spatial layers, based on the maximum MIMO capability of the UE.

FIG. 6 is a flow diagram that illustrates an exemplary process for configuring for PLMN transmission to a UE 110, using a higher number of MIMO spatial layers, based on a maximum MIMO capability of a UE 110. The exemplary process of FIG. 6 may be implemented by a sector scheduler 115 of a base station 110 currently serving a UE 110.

Figure 7:
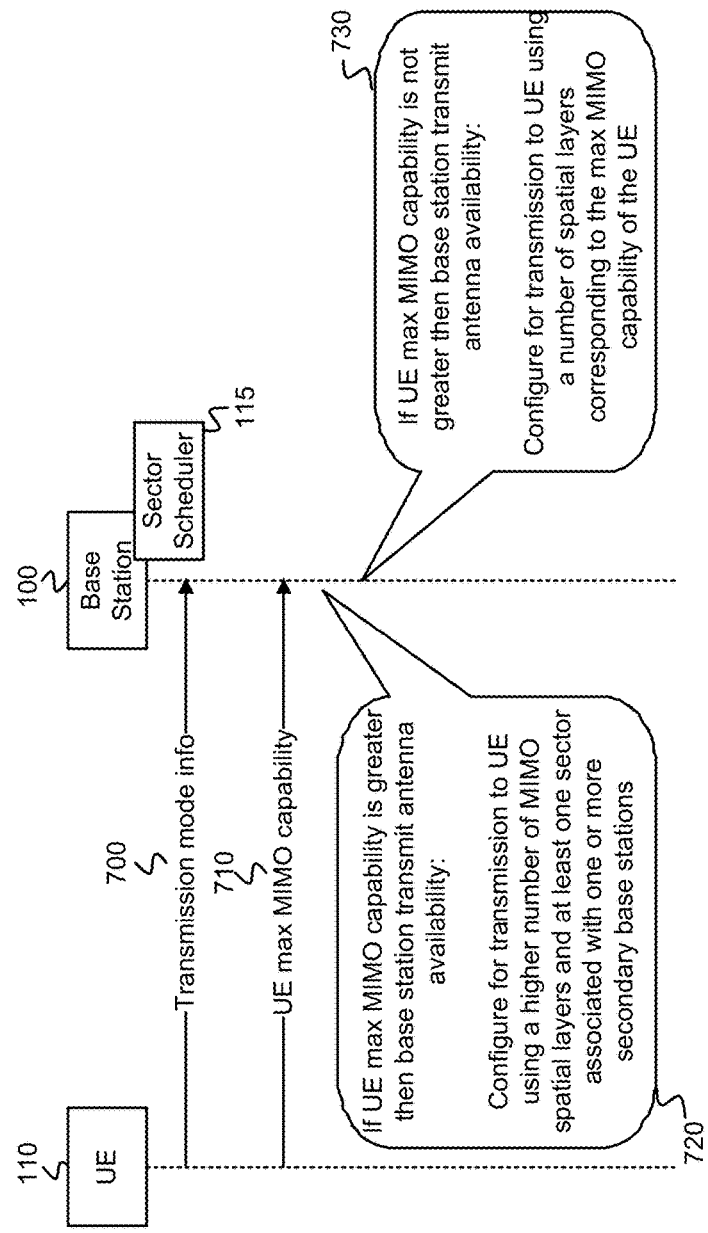
FIG. 7 is an operations and messaging diagram associated with the exemplary process of FIG. 6.

The exemplary process includes a primary base station 100 receiving transmission mode information from a UE 110 (block 600). The transmission mode information indicates one of various different transmission modes that has been established between the primary base station 100 and the UE 110 during connection setup for uplink/downlink transmission. The different transmission modes may include, for example, a single transmit antenna mode, a transmit diversity mode, an n spatial layer transmission mode (where n is greater than or equal to two), a closed loop spatial multiplexing mode, etc. FIG. 7 depicts base station 100 receiving transmission mode information 700 from UE 110.

Primary base station 100 receives, from the UE 110, the maximum MIMO capability of the UE 110 that equals the maximum number of spatial layers that the UE can receive and decode (block 610). Each spatial layer that the UE 110 can receive requires a separate receive antenna, so the highest number of spatial layers that the UE 110 can receive and decode equals the maximum number of receive antennas that the UE 110 currently has available. For example, if the UE 110 has 4 currently available receive antennas, then the maximum MIMO capability of the UE 110, and the highest number of spatial layers that the UE 110 can receive and decode, would be four. FIG. 7 depicts base station 100 receiving a UE max MIMO capability 710 from UE 110.

Primary base station 100 determines if the UE maximum MIMO capability is greater than the primary base station 100's transmit antenna availability (block 620). Primary base station 100 determines how many transmit antennas of antenna array 210 are currently available for use to transmit data to UE 110. Primary base station 100 then compares the determined number of transmit antennas with the maximum MIMO capability of the UE 110 received in block 610.

If the UE maximum MIMO capability is greater than the primary base station's transmit antenna availability (YES—block 620), then primary base station 100 configures for transmission to the UE 110 using a higher number of MIMO spatial layers and at least one sector associated with one or more secondary base stations (block 640). Further details of one exemplary implementation of configuring for transmission to the UE 110 using a higher number of MIMO spatial layers is described in detail below with respect to FIGS. 8A, 8B, 9 and 10. In one example, if two transmit antennas are currently available at primary base station 100, and the UE maximum MIMO capability is four, then the UE maximum MIMO capability exceeds the available transmit antennas at the primary base station 100, therefore, necessitating the use of two additional transmit antennas at one or more secondary base stations to attempt to increase the number of spatial layers to match the UE maximum MIMO capability. In another example, if four transmit antennas are currently available at primary base station 100, the UE maximum MIMO capability is eight, and the secondary base station only has two available transmit antennas, then six spatial layers (i.e., less than the UE maximum MIMO capability of eight) may be used for transmitting to the UE 110, including four spatial layers via the primary base station 100's four transmit antennas and two spatial layers via the secondary base station's two available transmit antennas. In a further example, if four transmit antennas are currently available at primary base station 100, the UE maximum MIMO capability is eight, a first secondary base station has two available transmit antennas, and a second secondary base station has two available transmit antennas, then eight spatial layers (i.e., equal to the UE maximum MIMO capability) may be used for transmitting to the UE 110, including four spatial layers via the primary base station 100's four transmit antennas, two spatial layers via the first secondary base station's two available transmit antennas, and two spatial layers via the second secondary base station's two available transmit antennas. FIG. 7 depicts base station 100, if the UE 110's max MIMO capability is greater than the base station transmit antenna availability, configuring 720 for transmission to the UE 110 using a higher number of MIMO spatial layers and at least one sector associated with a secondary base station.

If the UE maximum MIMO capability is not greater than the primary base station's transmit antenna availability (NO—block 620), primary base station 100 configures for transmission to the UE 110 using a number of spatial layers that correspond to the maximum MIMO capability of the UE 110 (block 630). For example, if two transmit antennas are currently available at primary base station 100, and the UE maximum MIMO capability is two, then the UE maximum MIMO capability is equal to, and does not exceed, the available transmit antennas at the primary base station 100 and, therefore, the primary base station 100 has sufficient available transmit antennas to transmit two spatial layers to the UE 110. As another example, if six transmit antennas are currently available at primary base station 100, and the UE maximum MIMO capability is four, then the UE maximum MIMO capability does not exceed the available transmit antennas at the primary base station 100, and the primary base station 100, alone, may transmit four spatial layers to the UE 110. FIG. 7 depicts primary base station 100, if the UE 110's max MIMO capability is not greater than the base station's transmit antenna availability, configuring 730 for transmission to the UE 110 using a number of spatial layers corresponding to the maximum MIMO capability of the UE 110.

The exemplary process of FIG. 6 may be executed when a new datastream is initiated for delivery to the UE 110, may be executed periodically (e.g., about every x seconds), and/or may be executed when a report containing a new set of candidate MIMO sectors (i.e., different than the previously reported set of candidate MIMO sectors), or a report indicating that the UE 110's maximum MIMO capability has changed, is received at the primary base station 100 from the UE 110.

Figure 8A:
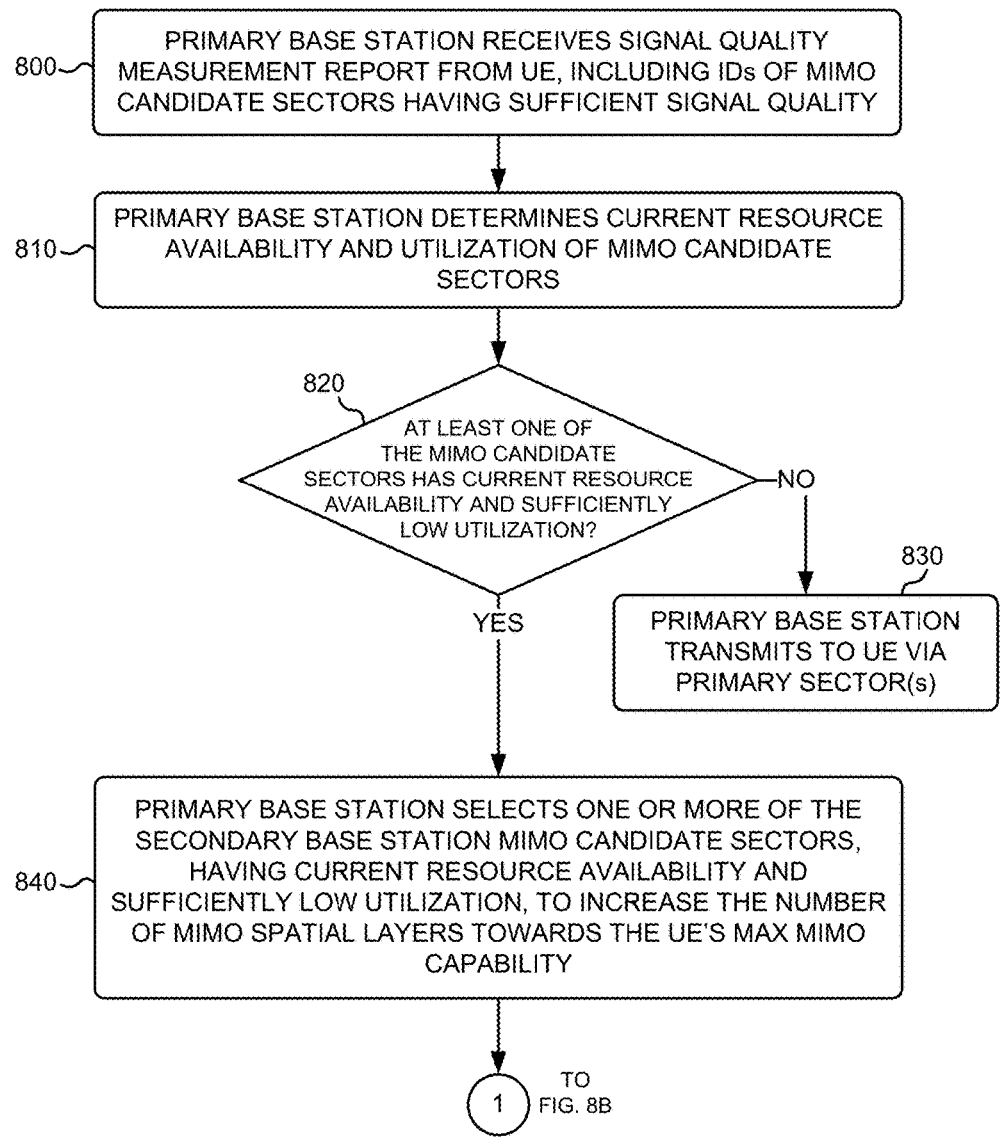
FIGS. 8A and 8B are flow diagrams that illustrate an exemplary process for configuring for transmission to a UE using a higher number of spatial layers and at least one sector associated with one or more secondary base stations.
Figure 8B:
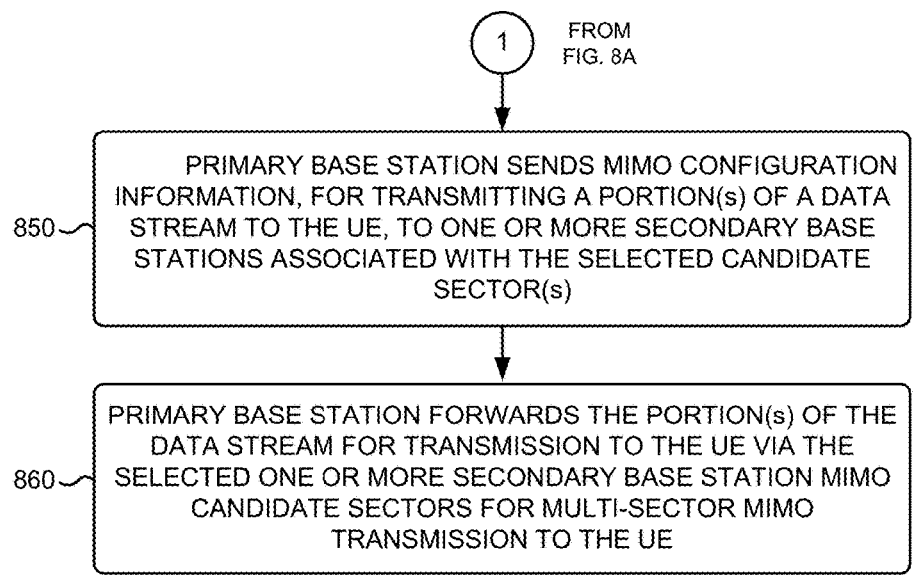

FIGS. 8A and 8B are flow diagrams that illustrate an exemplary process for configuring for transmission to UE 110 using a higher number of spatial layers and at least one sector associated with one or more secondary base stations. The exemplary process of FIG. 8 includes details of block 640 of FIG. 6 in a case where the UE maximum MIMO capability is greater than the primary base station 100-1's transmit antenna availability. The exemplary process of FIGS. 8A and 8B may be implemented by sector scheduler 115-1 of primary base station 100-1, in conjunction with at least one secondary base station 100-2.

The exemplary process includes primary base station 100-1 receiving a signal quality measurement report from a UE 110, including a list of IDs of MIMO candidate sectors having sufficient signal quality (block 800). The signal quality report may include a list of unique identifiers of all adjacent sectors that UE 110 determined, via signal measurement, to have signal qualities that equaled or exceeded a signal quality threshold(s). The signal quality report may additionally include the respective signal quality measurements for each of the adjacent sectors. FIG. 9 depicts primary base station 100-1 receiving a report 900 from UE 110 that includes a list of the candidate MIMO sector IDs, and respective signal quality measurements for the sectors in the list.

Primary base station 100-1 determines the current resource availability and utilization of the MIMO candidate sectors (block 810). The primary base station 100-1 requests current resource availability information and utilization information from each secondary base station that supports at least one of the MIMO candidate sectors. For example, the primary base station 100 may determine the current availability of radio resources (e.g., available time slot, frequency slot, etc.) for each of the MIMO candidate sectors. Additionally, the primary base station 100-1 may determine current utilization parameters, such as, for example, an average number of connections, an average bandwidth utilization, and/or an average signaling utilization for each of the MIMO candidate sectors. FIG. 9 depicts primary base station 100-1 determining 910 current resource availability and utilization of the MIMO candidate sectors identified in the report 900.

Primary base station 100-1 determines if at least one of the MIMO candidate sectors, associated with a secondary base station, has current resource availability and sufficiently low utilization (block 820). Primary base station 100 may compare the utilization obtained for each MIMO candidate sector to particular utilization thresholds. For example, an average number of connections for a MIMO candidate sector may be compared to a connection threshold and if the average number of connections is less than the connection threshold, then the MIMO candidate sector may be determined to have sufficiently low utilization.

If at least one of the MIMO candidate sectors, associated with a secondary base station, does not have current resource availability and sufficiently low utilization (NO—block 830), then primary base station 100-1 transmits to the UE 110 via a primary sector(s) (block 830). The antenna array 210 associated with the primary base station 100 may support a number of primary sectors that provide radio coverage to the current location of the UE 110. If none of the secondary base station MIMO candidate sectors has current resource availability and sufficiently low utilization, then primary base station 100 uses a maximum number of available primary sectors that is less than or equal to the maximum MIMO capability of the UE 110. For example, if the primary base station 100 supports three primary sectors that provide radio coverage to the current location of the UE 110, and the maximum MIMO capability of the UE 110 is two spatial layers, then primary base station transmits the datastream to the UE 110 using two available transmit antennas associated with two of the three primary sectors.

If at least one of the MIMO candidate sectors, associated with a secondary base station, has current resource availability and sufficiently low utilization (YES—block 820), then primary base station 100-1 selects one or more of the secondary base station MIMO candidate sectors, having current resource availability and sufficiently low utilization, to increase the number of MIMO spatial layers towards the UE 110's maximum MIMO capability (block 840). For example, if the primary base station 100-1 supports two primary sectors that provide radio coverage to the current location of the UE 110, the maximum MIMO capability of the UE 110 is four spatial layers, and the secondary base station supports three of the MIMO candidate sectors that have current resource availability and sufficiently low utilization, then the primary base station 100-1 selects two of the three secondary base station MIMO candidate sectors to increase the number of spatial layers used to transmit to the UE 110 up to the UE maximum MIMO capability of four. FIG. 9 depicts primary base station 100-1 selecting 920 one or more of the MIMO candidate sectors, having current resource availability and sufficiently low utilization, to increase the number of MIMO spatial layers.

In some implementations, an algorithm may be used for selecting the one or more secondary base station MIMO candidate sectors that, for example, ranks the MIMO candidate sectors or the secondary base stations among one another or uses weighting factors to select from the MIMO candidate sectors. In an implementation that uses ranking, the algorithm may rank the secondary base stations (i.e., the secondary base stations that support the MIMO candidate sectors identified in block 800) among one another based on a number of MIMO candidate sectors each secondary base station supports. For example, if a secondary_base_station_1 supports 1 MIMO candidate sector, a secondary_base_station_2 supports 4 MIMO candidate sectors, and a secondary_base_station_3 supports 2 MIMO candidate sectors, then the secondary base stations may be ranked in the order: secondary_base_station_2, secondary_base_station_3, secondary_base_station_1. Selection of the one or more secondary base station MIMO candidate sectors may be based on the ranking of the secondary base stations. For example, in the example above, since secondary_base_station_2 is ranked first, the MIMO candidate sectors of this secondary base station may be selected over MIMO candidate sectors supported by the other two secondary base stations. In another implementation, the algorithm may additionally, or alternatively, rank the MIMO candidate sectors among one another based on the measured signal quality of each sector. One or more of the MIMO candidate sectors having the highest signal qualities may then be selected to increase the number of MIMO spatial layers towards the UE's maximum MIMO capability. In a further implementation, ranking of both the secondary base stations based on a number of supported MIMO candidate sectors and ranking of the MIMO candidate sectors based on signal quality may be combined in a single algorithm to select one or more of the secondary base station MIMO candidate sectors for increasing the number of MIMO spatial layers.

Alternatively, instead of ranking secondary base stations and/or MIMO candidate sectors, an algorithm may be used that applies weighting factors to the secondary base stations and/or the MIMO candidate sectors, and the algorithm may calculate a weighted score based on the weighting factors to select the one or more secondary base station MIMO candidate sectors. In this implementation, a weighting factor may be applied to each secondary base station based on a number of MIMO candidate sectors supported by each respective secondary base station. Additionally, or alternatively, a weighting factor may be applied to each secondary base station based on a measured signal quality of each MIMO candidate sector supported by the secondary base station. The one or more secondary base stations may be selected, using the weighting factor algorithm, based on a highest weighted score derived by adding the weighting factors applied to the secondary base stations (e.g., based on number of supported MIMO candidate sectors) and/or the MIMO candidate sectors (e.g., based on the measured signal quality of each sector).

Primary base station 100-1 sends MIMO configuration information, for transmitting a portion(s) of a datastream to UE 110, to one or more secondary base stations associated with the selected candidate sector(s) (block 850). The MIMO configuration information may include, for example, transmission mode information that indicates one of various different transmission modes to be used for transmitting to the UE 110 via the selected candidate sector(s) associated with the one or more secondary base stations. FIG. 9 depicts primary base station 100-1 sending MIMO configuration information 925 to secondary base station 100-2 for configuring the transmission of data to the UE 110 via the selected candidate sector(s) (not shown).

Primary base station 100-1 forwards the portion(s) of the datastream for transmission to the UE 110 via the selected one or more secondary base station MIMO candidate sectors for multi-sector MIMO transmission to the UE 110 (block 860). Primary base station 100 may divide the datastream destined for the UE 110 into a number of portions (i.e., substreams) that correspond to the number of spatial layers to be used to transmit to the UE 110. For example, if four spatial layers are to be used to transmit the datastream to the UE 110, and three primary sectors are to transmit a portion of the datastream, and a single secondary sector is transmit another portion of the datastream, then primary base station 100-1 may divide the datastream into four substreams, with three substreams being transmitted via the three primary sectors, and one of the substreams being forwarded to the secondary base station for transmission via the single secondary sector. FIG. 9 depicts primary base station 100-1 forwarding 930 a second portion of the datastream, destined for the UE 110, to the secondary base station 100-2 for transmission via the selected one or more MIMO candidate sectors. Furthermore, FIG. 9 illustrates primary base station 100-1 transmitting 940 a first portion of the datastream via a primary sector(s) to UE 110, and secondary base station 100-2, upon receipt of the forwarded second portion of the datastream, transmitting 950 the second portion of the datastream to the UE 110 via a secondary sector(s).

The exemplary process of FIGS. 8A and 8B may be executed when a new datastream is initiated for delivery to the UE 110, may be executed periodically (e.g., about every x seconds), or may be executed when a report containing a new set of candidate MIMO sectors (i.e., different than the previously reported set of candidate MIMO sectors), and/or a report indicating that the UE 110's maximum MIMO capability has changed, is received at the primary base station 100 from the UE 110.

Figure 10:
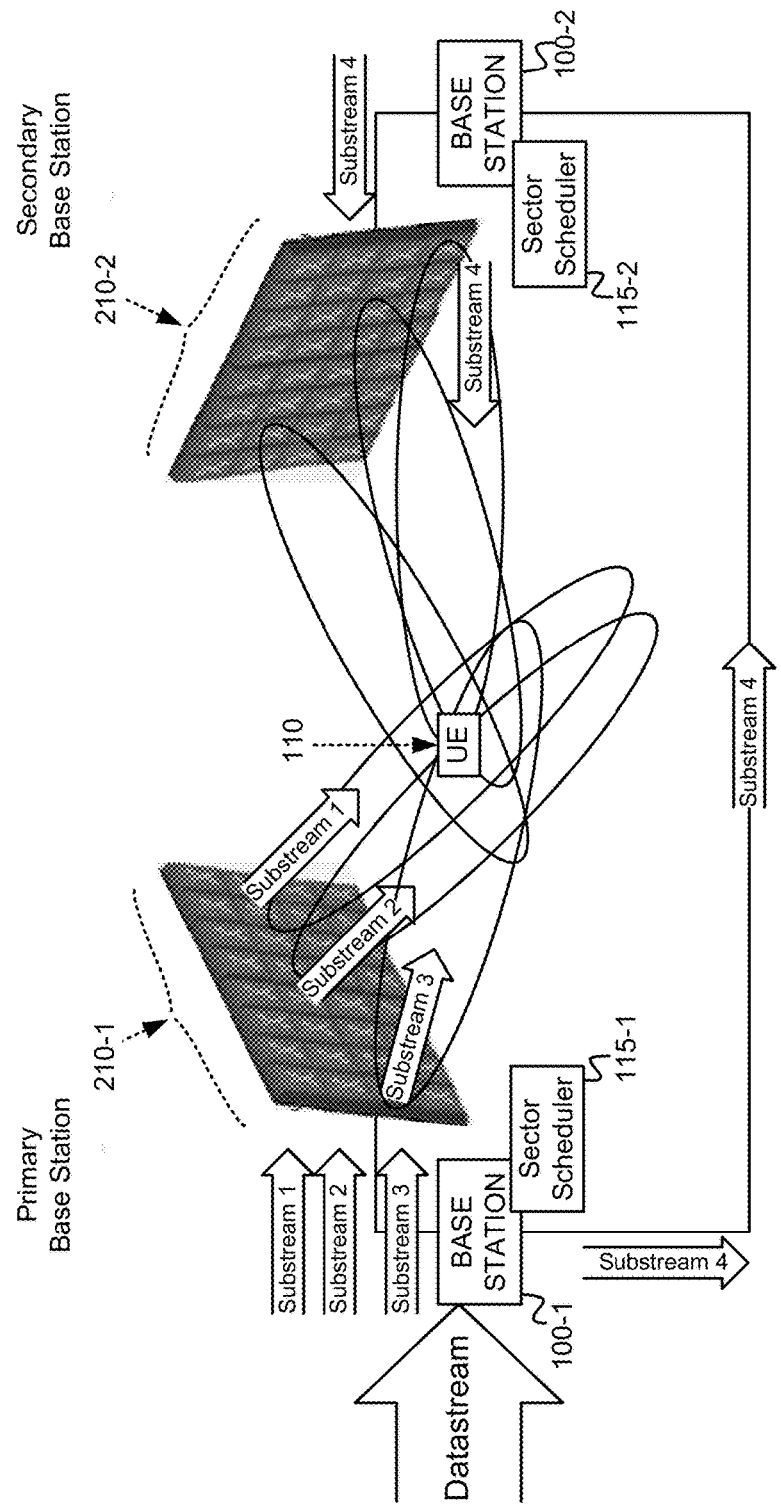
FIG. 10 depicts an example of the parallel transmission of substreams of a datastream to a UE via a primary base station, a secondary base station, and multiple sectors.

FIG. 10 depicts an example of the parallel transmission of substreams of a datastream to a UE 110 via a primary base station 100-1, a secondary base station 100-2, and multiple adjacent sectors. In the example of FIG. 10, UE 110 has a maximum MIMO capability of four spatial layers, and antenna array 210-1 of primary base station 100-1 has a current transmit antenna availability of three antennas. When a datastream, destined for UE 110, is received at primary base station 100-1, sector scheduler 115 of primary base station 100-1 determines that the UE 110's MIMO capability exceeds the available transmit antennas of antenna array 210-1. From a list of MIMO candidate sectors obtained from UE 110 via measurement of signal qualities at UE 110, sector scheduler 115 of primary base station 100-1 determines that a secondary base station 100-2, associated with a sector from the MIMO candidate sector list, has current resource availability and sufficiently low utilization.

Sector scheduler 115 of primary base station 100-1 then divides the datastream into four substreams (substream 1, substream 2, substream 3, and substream 4), and transmits three of the substreams to UE 110 via three different primary sectors generated by antenna array 210-1. Sector scheduler 115 of primary base station 100-1 additionally forwards one of the substreams (substream 4) to the secondary base station 100-2, and the secondary base station 100-2 transmits the substream to UE 110 via a secondary sector generated by antenna array 210-2. Upon receipt of the four substreams via the four spatial layers, UE 110 recombines the substreams to recreate the original datastream. Sector scheduler 115 may also send configuration information, to the secondary base station(s) 100, that indicates the transmission configuration (e.g., transmission mode, etc.) for transmitting the data substream(s) (data substream 4). During the resulting MIMO transmissions by antenna array 210-1 and antenna array 210-2, the UE 110 conducts signal quality measurements of the adjacent sectors providing radio coverage to the location of UE 110, including the sector(s) associated with the secondary base station 100-2, and reports the signal quality measurements to the primary base station 100-1.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 4, 6, 8A, and 8B, and operations/signaling/message flows with respect to FIGS. 5, 7, and 9, the order of the blocks and/or operations/signaling/ message flows may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

To the extent the aforementioned embodiments collect, store, or employ personal information of individuals, it should be understood that such information shall be collected, stored, and used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   determining a maximum multiple-input, multiple-output (MIMO) capability of a user equipment (UE), wherein the maximum MIMO capability equals a maximum number of spatial layers that the UE can receive;
   determining if a number of transmit antennas of a first base station of a wireless network, that serves a location of the UE, is less than the maximum MIMO capability of the UE;
   identifying adjacent sectors of the wireless network that currently serve the location of the UE;
   selecting at least one adjacent sector, associated with a second base station, from the identified adjacent sectors based on the number of transmit antennas of the first base station being less than the maximum MIMO capability of the UE; and
   transmitting data to the UE via one or more transmit antennas of the first base station and at least one transmit antenna associated with the selected at least one adjacent sector of the second base station.

2. The method of claim 1, further comprising:
   receiving at least one report, from the UE, that includes measured signal qualities of the adjacent sectors; and
   identifying the adjacent sectors based on the received at least one report.

3. The method of claim 1, further comprising:
   determining a current resource availability of each of the adjacent sectors; and
   determining utilization information of each of the adjacent sectors.

4. The method of claim 3, wherein the current resource availability comprises currently available radio resources within each of the adjacent sectors and wherein the utilization information comprises an average number of connections, an average bandwidth utilization, or an average signaling utilization within each of the adjacent sectors.

5. The method of claim 3, further comprising:
   selecting the at least one adjacent sector from the identified adjacent sectors further based on the determined current resource availability and the determined utilization information of each of the identified adjacent sectors.

6. The method of claim 1, wherein transmitting the data to the UE further comprises:
   transmitting a first portion of the data to the UE via the one or more transmit antennas of the first base station; and
   forwarding a second portion of the data to the second base station for transmission to the UE via the at least one transmit antenna associated with the selected at least one adjacent sector.

7. The method of claim 1, wherein the selecting at least one adjacent sector from the identified adjacent sectors further comprises:
   selecting the at least one adjacent sector to increase a number of MIMO spatial layers for transmitting the data to the UE towards the UE's maximum MIMO capability.

8. The method of claim 1, wherein selecting the at least one adjacent sector, associated with a second base station, from the identified adjacent sectors further comprises:
   performing at least one of:
      ranking the second base station, among other base stations, based on a number of adjacent sectors that the second base station and the other base stations support to produce a first ranking, or
      ranking the adjacent sectors among one another based on a measured signal quality associated with each of the adjacent sectors to produce a second ranking; and
   selecting the at least one adjacent sector associated with the second base station based on the first ranking and/or the second ranking.

9. The method of claim 1, wherein selecting the at least one adjacent sector, associated with a second base station, from the identified adjacent sectors further comprises:
   performing at least one of:
      applying a first weighting factor to the second base station, and other base stations, based on a number of adjacent sectors that the second base station and the other base stations support, or
      applying a second weighting factor to each of the adjacent sectors based on a measured signal quality associated with each of the adjacent sectors;
   determining a weighted score based on the applied first and/or second weighting factors; and
   selecting the at least one adjacent sector associated with the second base station based on the determined weighted score.

10. A system, comprising:
    a first antenna array; and
    a sector scheduler configured to:
       determine a maximum multiple-input, multiple-output (MIMO) capability of a user equipment (UE), wherein the maximum MIMO capability equals a maximum number of spatial layers that the UE can receive;
determine if a number of transmit antennas of the first antenna array, that serves a location of the UE, is less than the maximum MIMO capability of the UE;
identify adjacent sectors of a wireless network that currently serve the location of the UE;
select at least one adjacent sector, associated with a second antenna array, from the identified adjacent sectors based on the number of transmit antennas of the first antenna array being less than the maximum MIMO capability of the UE; and
cause data to be transmitted to the UE via one or more transmit antennas of the first antenna array and at least one transmit antenna associated with the selected at least one adjacent sector and the second antenna array.

11. The system of claim 10, wherein the sector scheduler is further configured to:
receive at least one report, from the UE, that includes measured signal qualities of the adjacent sectors; and
identify the adjacent sectors based on the received at least one report.

12. The system of claim 10, wherein the sector scheduler is further configured to:
determine a current resource availability of each of the adjacent sectors; and
determine utilization information of each of the adjacent sectors.

13. The system of claim 12, wherein the current resource availability comprises currently available radio resources within each of the adjacent sectors and wherein the utilization information comprises an average number of connections, an average bandwidth utilization, or an average signaling utilization within each of the adjacent sectors.

14. The system of claim 12, wherein the sector scheduler is further configured to:
select the at least one adjacent sector from the identified adjacent sectors further based on the determined current resource availability and the determined utilization information of each of the identified adjacent sectors.

15. The system of claim 10, wherein, when causing the data to be transmitted to the UE, the sector scheduler is further configured to:
cause a first portion of the data to be transmitted to the UE via the one or more transmit antennas of the first antenna array; and
forward a second portion of the data to the second antenna array for transmission to the UE via the at least one transmit antenna associated with the selected at least one adjacent sector.

16. The system of claim 10, wherein, when selecting at least one adjacent sector from the identified adjacent sectors, the sector scheduler is further configured to:
select the at least one adjacent sector to increase a number of MIMO spatial layers for transmitting the data to the UE towards the UE's maximum MIMO capability.

17. A non-transitory storage medium storing instructions executable by a processor of a primary system, wherein the instructions comprise instructions to cause the processor to:
determine a maximum multiple-input, multiple-output (MIMO) capability of a user equipment (UE), wherein the maximum MIMO capability equals a maximum number of spatial layers that the UE can receive;
determine if a number of transmit antennas of a first antenna array associated with the primary system, that serve a location of the UE, is less than the maximum MIMO capability of the UE;
identify adjacent sectors of a wireless network that currently serve the location of the UE;
select at least one adjacent sector, associated with a second antenna array, from the identified adjacent sectors based on the number of transmit antennas of the primary system being less than the maximum MIMO capability of the UE; and
cause data to be transmitted to the UE via one or more transmit antennas of the primary system and at least one transmit antenna associated with the selected at least one adjacent sector and the second antenna array.

18. The non-transitory storage medium of claim 17, wherein the instructions comprise instructions to cause the processor to:
receive at least one report, from the UE, that includes measured signal qualities of the adjacent sectors; and
identify the adjacent sectors based on the received at least one report.

19. The non-transitory storage medium of claim 17, wherein the instructions comprise instructions to cause the processor to:
determine a current resource availability of each of the adjacent sectors; and
determine utilization information of each of the adjacent sectors.

20. The non-transitory storage medium of claim 19, wherein the instructions comprise instructions to cause the processor to:
select the at least one adjacent sector from the identified adjacent sectors further based on the determined current resource availability and the determined utilization information of each of the identified adjacent sectors.

* * * * *